United States Patent
Crawford

(10) Patent No.: US 10,455,410 B2
(45) Date of Patent: Oct. 22, 2019

(54) SENSOR-TRIGGERED SOFTWARE DEFINED DEVICE

(71) Applicant: AT&T MOBILITY II LLC, Atlanta, GA (US)

(72) Inventor: Jerry Crawford, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 235 days.

(21) Appl. No.: 15/172,986

(22) Filed: Jun. 3, 2016

(65) Prior Publication Data
US 2017/0353530 A1    Dec. 7, 2017

(51) Int. Cl.
| | |
|---|---|
| *H04W 4/06* | (2009.01) |
| *H04W 8/22* | (2009.01) |
| *H04L 29/08* | (2006.01) |
| *H04W 4/38* | (2018.01) |

(52) U.S. Cl.
CPC ............ *H04W 8/22* (2013.01); *H04L 67/12* (2013.01); *H04L 67/18* (2013.01); *H04L 67/34* (2013.01); *H04W 4/06* (2013.01); *H04W 4/38* (2018.02)

(58) Field of Classification Search
CPC .................................. H04L 67/10; H04W 8/22
See application file for complete search history.

(56) References Cited

U.S. PATENT DOCUMENTS

| | | |
|---|---|---|
| 6,195,678 B1 | 2/2001 | Komuro et al. |
| 7,139,551 B2 | 11/2006 | Jamadagni et al. |
| 8,787,947 B2 | 7/2014 | Backholm et al. |
| 2009/0133014 A1 | 5/2009 | Laurila et al. |
| 2012/0042036 A1* | 2/2012 | Lau ............ G06F 8/61 709/217 |
| 2013/0040561 A1 | 2/2013 | Conde e Silva et al. |
| 2013/0210404 A1 | 8/2013 | Curtis et al. |
| 2014/0181539 A1* | 6/2014 | Lin ........ G06F 1/3296 713/300 |
| 2014/0215457 A1 | 7/2014 | Gava et al. |
| 2014/0349629 A1* | 11/2014 | Chan ........ H04W 8/22 455/418 |
| 2014/0370818 A1 | 12/2014 | Luna |
| 2015/0017964 A1 | 1/2015 | Cha |
| 2015/0127717 A1 | 5/2015 | Teibel et al. |
| 2015/0154077 A1* | 6/2015 | Marra ........ G06F 11/143 714/15 |
| 2015/0373128 A1 | 12/2015 | Serbinis |
| 2016/0004709 A1 | 1/2016 | Butts |
| 2016/0072913 A1 | 3/2016 | Baldwin |

OTHER PUBLICATIONS

Jamadagni, NS S. , "A minimal signaling channel for SDR download support", 22nd General Meeting of the SDR Forum, Atlanta, GA, USA, 2001.

* cited by examiner

*Primary Examiner* — Michael A Keller
(74) *Attorney, Agent, or Firm* — Guntin & Gust, PLC; Mark Wilinski

(57) ABSTRACT

Aspects of the subject disclosure may include, for example, detecting sensor data obtained from a sensor of a device, such as a mobile communication device. An operational capability is determined based on the sensor data, and a determination is made that the operational capability is not available at the device. In response to determining that the operational capability is not available at the device, an application program is identified based on the operational capability and a transfer is facilitated of the application program to the device. Other embodiments are disclosed.

20 Claims, 6 Drawing Sheets

300

SENSOR-TRIGGERED SOFTWARE DEFINED DEVICE

FIELD OF THE DISCLOSURE

The subject disclosure relates to a sensor-triggered software defined device.

BACKGROUND

Software application programs, sometimes referred to as "apps," provide a specific set of functions. Such apps can include self-contained programs designed to run on a particular device or system and to fulfill a particular purpose. In this manner, the apps can be said to provide a function, a capability or set of capabilities to the particular platform on which they are used. Apps are also generally designed to run on specific devices, and are written for a specific operating system, such as iOS®, Mac® OS X®, Windows®, or Android. Mac, OSX and iOS are registered trademarks of Apple Inc., Cupertino, Calif. Windows is a registered trademark of Microsoft Corp., Redmond, Wash. Platforms that use apps can include without limitations, desktop computers, servers and mobile devices, such as mobile phones, tablets, and the like.

Apps can be distributed according to digital distribution platforms, such as online store settings, in which users can browse through different app categories, view information about each app (such as reviews or ratings), and acquire the app by downloading it, after which the app installs on the device. Prominent app stores include, without limitation, the App Store®, an official app store for the iOS operating system, and Google Play®, the official app store for the Android operating system—registered trademarks, respectively, of Apple, Inc., Cupertino, Calif. and Google Inc., of Mountain View, Calif. Such distribution platforms are generally accessible from a corresponding application on the recipient device, such as an App Store application on an iPhone®, iPod® or iPad®, registered trademarks of Apple, Inc. In some scenarios, web applications can be downloaded from a web server and installed on devices, without necessarily using one of the available app stores.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for monitoring sensor data of a platform equipped with sensors and downloading content, such as apps, to the platform to add capabilities based on the sensor data. Other embodiments are described in the subject disclosure.

One or more aspects of the subject disclosure include a device having a processing system that includes a processor and a memory that stores executable instructions. The executable instructions, when executed by the processing system, facilitate performance of operations that include monitoring environmental sensor data obtained from a sensor of a mobile communication device. An operational capability is associated with the environmental sensor data, and a determination is made as to whether the operational capability is not available at the mobile communication device. In response to determining that the operational capability is not available, a mobile application is identified based on the operational capability, and a transfer of the mobile application is facilitated from a distribution source to the mobile communication device.

One or more aspects of the subject disclosure include a process that monitors sensor data obtained from a sensor of a device, such as a mobile communication device. An operational capability is associated with the sensor data and a determination is made as to whether the operational capability is available at the device. In response to the determining that the operational capability is not available, application software is identified, based on the operational capability, and a transfer is facilitated of the application software from a distribution source to the device.

One or more aspects of the subject disclosure include a machine-readable storage medium that includes executable instructions. The instructions, when executed by a processing system including a processor, facilitate performance of operations that include detecting sensor data obtained from a sensor of a device, such as a mobile communication device. An operational capability is determined based on the sensor data, and a determination is made that the operational capability is not available at the device. In response to determining that the operational capability is not available at the device, an application program is identified based on the operational capability and a transfer is facilitated of the application program to the device.

Content, such as software programs, apps files and media occupy memory resources of the devices upon which they are installed. Due to size limitations of physical memory, there is a limit as to a number of apps, media files, and the like that can be simultaneously resident on a single device. This is particularly true for mobile devices in which size, weight and power consumption can further limit storage capacity.

Figure 1:
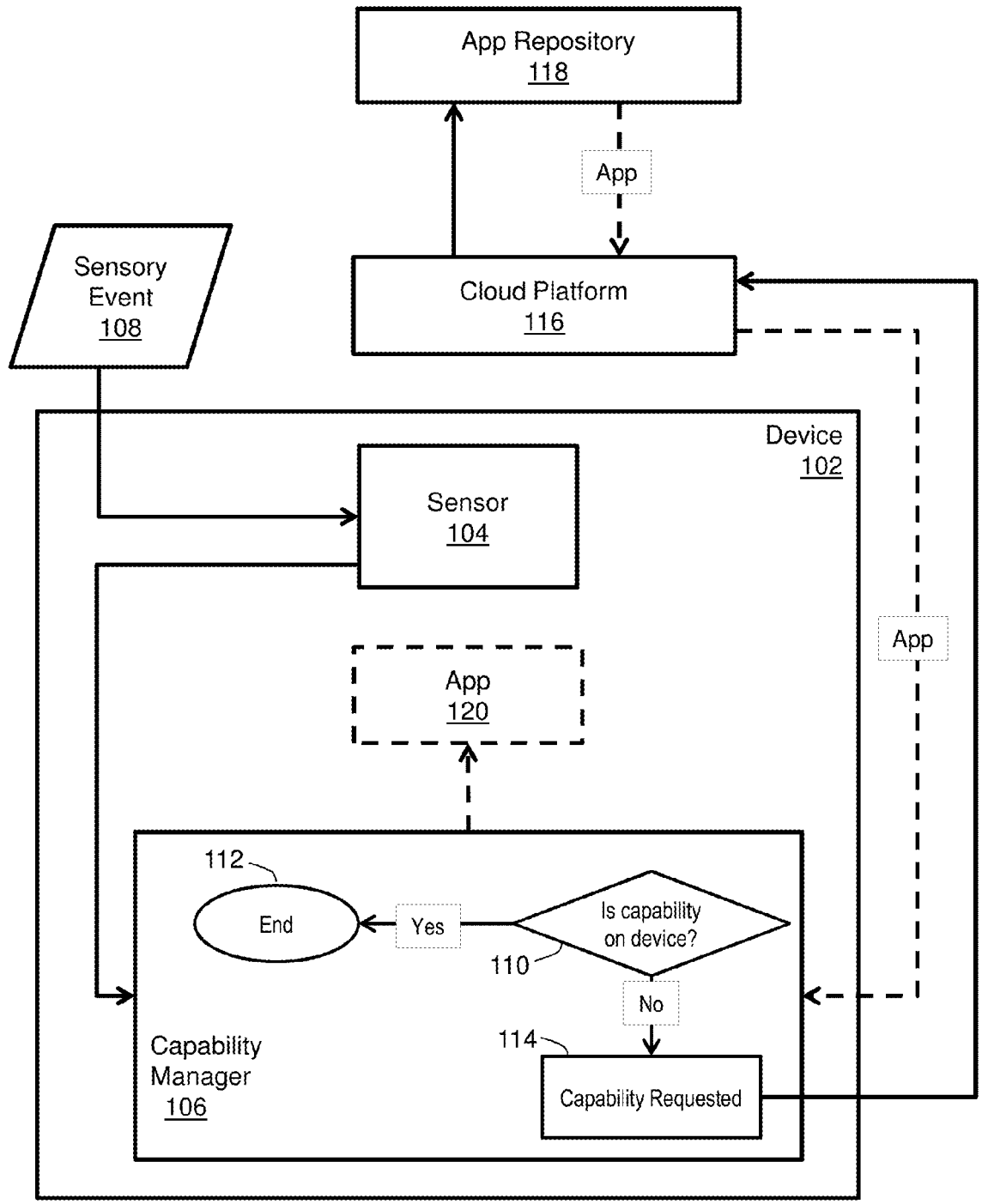
FIG. 1 depicts an illustrative embodiment of a system that manages capabilities based on sensor data.

FIG. 1 depicts an illustrative embodiment of a system 100 that manages capabilities based on sensor data. The system 100 includes a device 102, a network accessible device, such as a cloud platform 116, and a content distribution source or platform, such as an app repository 118. The device 102, in turn, includes a sensor 104, a capability manager 106, and one or more application software programs, e.g., apps 104. In some embodiments, the device 102 includes one or more media content items, e.g., media files, such as stored audio files, sounds, music, ring-tones, images, video clips, movies, and the like.

The device 102 can include a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by the device 102. More generally, the device 102 can be enabled to function within an Internet of Things (IoT). The IoT generally refers to a network of physical objects that collect and/or exchange data. Such objects can include, without limitation, physical devices, vehicles, buildings and other items, embedded with electronics, software, sensors, and network connectivity that enables these objects to collect and exchange data according to the IoT.

The app repository 118 can includes, without limitation, the App Store®, for iOS® devices and Google Play® for Android operating system devices. The app repository 118 can be configured to allow users to browse and download applications. In some applications, companies can publish in-house apps to "employees" using an enterprise version of a distribution platform, e.g., the App Store. More generally, the app repository 118 can include a web site, web server, network accessible storage device, or the like providing access to apps.

More generally, a content distribution source or platform can include online stores, such as iTunes®, Amazon®, YouTube®, social media applications, such as Facebook®, web sites, and/or personal libraries, In at least some embodiments, content can include streaming media, including broadcasts, live streams, and/or on-demand streams.

The cloud platform 116 can be an Internet-based computing system that provides shared processing resources and data to computers and other devices on demand. Cloud computing and storage solutions generally provide users and/or enterprises with various capabilities to store and process their data in third-party data centers. In the illustrative embodiments, the cloud platform 116 can include functionality to cooperate with the capability manager 106 to provision the device 102 with apps 120, as required.

The app 120 can include a software application program that provides a specific set of functions. Such an app 120 can include, without limitation, a self-contained program designed to run on a particular device 102 and/or system 100 and to fulfill a particular purpose, e.g., provide a particular capability to the device 102 and/or system 100. The app 120 can be designed to run on a specific device 102, e.g., according to a specific operating system, such as iOS®, Mac® OS X®, Windows®, or Android. It is understood that some app repositories 118 can include multiple apps 120 that provide identical or similar functionality, but configured for particular operating systems and/or platforms. For example, a first version of a "flashlight" app is designed to control a light source of a resident iOS® platform; whereas, a second version of the flashlight app is designed to control a light source of a resident Android platform in a similar if not identical manner. Selection of the app can be based, at least in part, on the resident device 102.

It is understood that the device 102 can include one or more sensors 104 that operate independently from each other. In some embodiments, more than one of the sensors 104 can interwork cooperatively, e.g., providing sensor data based on a combination of the sensors 104. The sensors 104 can include, without limitation, one or more of: motion sensors; environmental sensors and position sensors. Motion sensors can include, without limitation, accelerometers, gravity sensors, gyroscopes, and/or rotational vector sensors that measure one or more of acceleration forces and rotational forces along one or more, e.g., three axes. Environmental sensors can include, without limitation: barometers; photometers; moisture sensors; salinity sensors; image sensors, e.g., still and or video cameras; pressure sensors; stress and/or strain sensors; microphones; proximity sensors and thermometers, e.g., thermocouples, that measure one or more of various environmental parameters, such as ambient air temperature and pressure, illumination, images, sounds and humidity. Position sensors can include, without limitation, orientation sensors, altimeters, GPS receivers and magnetometers that measure, e.g., a physical position of a device.

In some applications, the sensors can include biometric sensors, such as those adapted to sense one or more of blood pressure, pulse, blood oxygen level, body temperature, salinity, bodily electrical activity, such as those obtained through electrocardiography, electroencephalography, and so on. Biometric sensors can include, without limitation, sensors adapted to identification and/or authentication of an individual, e.g., through a finger print scanner, a voice recognition detector, and the like.

Other sensors include, without limitation, infrared sensors, ultrasonic sensors, photoelectric sensors, photovoltaic sensors, optical sensors, radio frequency (RF) sensors; chemical sensors; and radiation sensors. Ultrasonic sensors convert ultrasound waves to electrical signals or vice versa, e.g., for range and/or movement. Photoelectric sensors can be used to discover the distance, absence, or presence of an object by using a light transmitter, often infrared, and a photoelectric receiver. Photovoltaic sensors, sometimes referred to as photodetectors, can detect light and/or other forms of electromagnetic energy. A solar cell is a form of photo detector that absorbs light and converts it into an electrical signal. RF sensors can detect electromagnetic energy and convert it to an electrical signal. Ultrasonic sensors convert ultrasound waves to electrical signals or vice versa. Chemical sensors can be adapted to provide one or more of detecting a presence of a chemical compound, determining a concentration of a chemical compound, and/or determining a composition analysis to determine one or more of presence and concentrations of compounds within a mixture. In some embodiments, chemical sensors can include chemiresistors that include electrical circuits modified so that a resistance changes when exposed to a particular chemical.

A particular class of chemical sensors are referred to as odor sensors, e.g., an electronic nose. Such sensors can include a sensor array that detects and/or discriminates complex odors. Example chemical sensors include the Cryanose® 320, vapor sensor, available from Sensigent of Baldwin Park, Calif. Other chemical sensors can include gas chromatography, liquid chromatography and mass spectrometry.

One or more of the sensors disclosed herein can include a detector or receiver to sense or otherwise detect or receive a corresponding signal. It is understood that in at least some embodiments, one or more of the sensors disclosed herein can also include a transmitter, to allow the sensors to transmit and receive corresponding signals. For example, an ultrasonic transducer can transmit an ultrasonic signal that might bounce off or otherwise reflect back from another object. The returned portion of the transmitted ultrasonic signal can be processed alone or in combination with the transmit signal to determine a presence of an object, a compositional characteristic of an object, e.g., hard or soft, a size of an object, a relative motion of the object and/or a distance to the object.

It is understood that signal processing can be applied to any of the foregoing sensor to facilitate detection and/or analysis of sensed properties. It is also understood that in at least some embodiments, processing can be applied to a group of sensors that can include a group of similar sensors and/or a group of dissimilar sensors. It is also understood that one or more application programs can provide analysis of sensor input from one or more of the sensors.

By way of example, a mobile phone equipped with a chemical sensor can be exposed to a food or beverage item to detect spoilage, to assess freshness and/or quality. An app on the mobile device can provide an indication of the assessment to a user, e.g., by a screen indication, an audible indication, or a combination thereof. Consider a mobile phone exposed to an open bottle of wine. A chemical sensor on the phone determines a characteristic of the wine based on a chemical composition of wine vapor. An app can provide information about the wine, e.g., a type, brand and/or vintage. In some embodiments an app can provide recommendations for meal pairings based on an analysis of the chemical output. Alternatively or in addition, an image sensor or camera can be used to capture an image of a label of the wine bottle. An app can provide information about the wine and/or recommendations for pairing, suggestions of other wines, and the like.

In another example, a user's smart phone sensors indicate that the user is outdoors. This can be determined, e.g., according to microphone picking up outside nature sounds, e.g., crickets, frogs, a thermometer detecting a cool temperature, an accelerometer determining that the user's device is stationary, a GPS receiver determining that the user's device is located in Zion National Park, and a gas sensor determining that there is a campfire. Sensor data from one or more of the sensors can be analyzed or otherwise interpreted. In at least some embodiments, the interpretation includes identification of a situation and/or scenario that correlates to the sensor data to a likely situation or scenario. In the illustrative example, the situational determination can include determining that the user is vacationing, e.g., away from home at a vacation destination, and relaxing, e.g., stationary, around a campfire, smoke. One or more capabilities can be associated with the scenario. For example, the capability can include music and/or stories that might accompany the deduced situation. In this example, the capability includes a selection of campfire/cowboy songs, and/or a service, such as PANDORA® that provides such songs. The songs and/or related service is downloaded and otherwise installed or provisioned to the mobile device.

In some embodiments, one or more of the sensors 104 provide, so called, raw sensor data. Alternatively or in addition, one or more of the sensors 104 provide preprocessed data. For example, rather than a thermocouple providing a pure voltage, the voltage might be adjusted according to a predetermined calibration factor to facilitate interpretation of a temperature reading from the voltage. Examples of an Android sensor framework are described in a "Sensors Overview" available online at https://developer.android.com/guide/topics/sensors/sensors_overview.html, and incorporated herein by reference in its entirety.

It is understood that one or more sensors 104 can be integrated with the device, e.g., incorporated within a common housing of the device 102. Alternatively or in addition, one of more of the sensors 104 can be external to the device 102. Such external sensors 104 can be in communication with the device 102, e.g., with the capability manager 106, by way of a physical connection, as in a wired connection, a wired network connection, or a physical connection interface, e.g., to accommodate a plug-in sensor, and so on. Alternatively or in addition, one or more of the sensors 104 can communicate with the device 102 by way of a wireless connection. Such wireless connections can include, without limitation, a personal area network, e.g., according to a BlueTooth protocol, a near-field communication (NFC) interface, and/or more generally, any of the wireless technologies disclosed herein, including, without limitation, any of the IEEE 802.11 media access control (MAC) and physical layer (PHY) specifications, created and maintained by the Institute of Electrical and Electronics Engineers (IEEE), e.g., wireless local area networks, WiFi, and the like.

A sensor 104 is operable to provide sensor data in response to a sensory event 108. In at least some embodiments, the sensory event 108 can occur in a physical environment of the device 102. Accordingly, the resulting sensor data indicative of a feature of the physical environment can be provided to the capability manager 106.

In some embodiments, the capability manager 106 facilitates an adaptation of a configuration of the device 102 to add, remove and/or modify a capability of the device 102 based on one or more sensory events 108. In some embodiments, the capability comprises one or more content items, e.g., media content, Media content can include, without limitation, audio, e.g., music and/or sounds, text, images, multimedia, e.g., video, and the like. The capabilities of the device 102 can be added, removed and/or modified by way of one or more apps 120 and/or one or more content items. For example, the capability manager 106 can identify a capability and associate the capability with a particular app 120 and or a content item. Associations between capabilities and apps and/or content items can be accomplished by various techniques, including, without limitation, the use of a predetermined association, e.g., according to a look-up table, a database, and the like.

It is understood that in at least some embodiments the predetermined associations and/or other capability analytics can be performed locally, on the device, remotely, e.g., by way of the cloud platform 116, or in some combination of locally and remotely.

In some embodiments, a predetermined association may not exist, or may be determined to be inaccurate and/or insufficient. In such instances, the capability manager 106 alone or in combination with other system elements, such as the cloud platform 116, can determine an association between a content item, such as an app 120 and/or a media content item, and the target capability. Determination of the association can include access and evaluation of information related to one or more of the target capability and the content, e.g., the app and/or media content item. Information can include, without limitation, descriptive information, e.g., related to the content, e.g., the app and/or media content item, as might be available from an app distribution source, a curator of a content repository, a content item store, a content service provider, an app developer, a third-party app evaluator, e.g., CNET, and the like. Alternatively or in addition, descriptive information can be obtained by way of social networking, e.g., through evaluations, comments, and the like provided by users of social media, such as Facebook® and/or Twitter® online social networking applications, and the like.

It is understood that in some instances descriptions provided alone or in combination with other commentary may not precisely identify an association between a target capability and a content item, such as an app and/or a media content item. In such instances, identification and/or selection of an content item can be based upon an algorithm and/or an educated guess. Such algorithms/educated guesses can be based on one or more of a particular content source, a particular content category, a particular content distribution platform, a particular content developer, producer, curator, and the like. In some instances, association of a content item, such as an app and/or media content item with a target capability can be based on historical records associated with one or more of the device 102, the cloud platform 116 and/or the app repository 118.

It is envisioned that content items, such as apps 120 and/or media content items can be installed on a device 102 when needed, then removed at a later time for any of various reasons, e.g., to conserve limited physical storage of the device 102. Thus, it is likely that a content item, e.g., an app 120 and/or media content item may identified according to any of the techniques disclosed herein, installed on the device 102 at a first time based on a sensory event 108 at the device 102 to provide an associated capability at the device 102 at or shortly after a time of the event. The content item, e.g., the app 120 and/or the media content item can be subsequently removed to clear memory space, and identified again, at a later time, e.g., in response to another sensory event 108. It is understood that the same sensory event 108 and/or a different sensory event 108 may result in an identification of a common capability.

In at least some scenarios, identification of a suitable content item, e.g., app and/or media content item, to provide the target capability can be accomplished in an iterative fashion. For example, an app 120 can be identified and installed on the device 102, followed by an evaluation during which applicability of the app 120 to the target capability is determined. Such an evaluation can be based on data collected by the device alone or in combination with user input. For example, a user interface (not shown) can be configured to request user feedback to rate or otherwise identify applicability of the app 120 to the capability.

In some instances, more than one content items, e.g., apps 120 and/or media content items may be associated with the target capability. The content items, e.g., apps 120, may be different apps from a common distribution platform and/or app developer. Alternatively or in addition, the content items, e.g., apps 120, may be different apps from different distribution platforms and/or different app developers. It is understood that certain content items, e.g., apps 120, may be perceived as preferable for any of various reasons, e.g., a source, a price, ratings, a prior experience, and the like. In such instances, the capability manager 106 can store, update and/or otherwise access a preferred listing. Such preferences can be determined according to a rating scale, a numeric and/or letter user preference rating on the scale, and the like. Thus, in identifying the content item, e.g., the app 120, the capability manager 106, the cloud platform 116 and/or the app repository 118 can access such preferences, e.g., basing identification of a particular app 120 at least in part, based on such preferences.

By way of illustrative example, the sensor 104 is exposed to a sensory event 108. The sensor 104 generates sensor data and provides it to the capability manager 106. The capability manager 106 identifies a capability based on the sensor data and determines whether the capability is already available to the device at 110. If so, the capability manager does not request a capability, instead, continuing to monitor the sensor data at 112 for any subsequent needs. However, if it is determined that the capability is not available to the device, a process to facilitate a provisioning of the capability is initiated at 114. The capability can include functionality, e.g., provided by one or more apps, and/or media content, e.g., an image, a song, a sound, a movie, a document, a text file, and the like.

Figure 2:
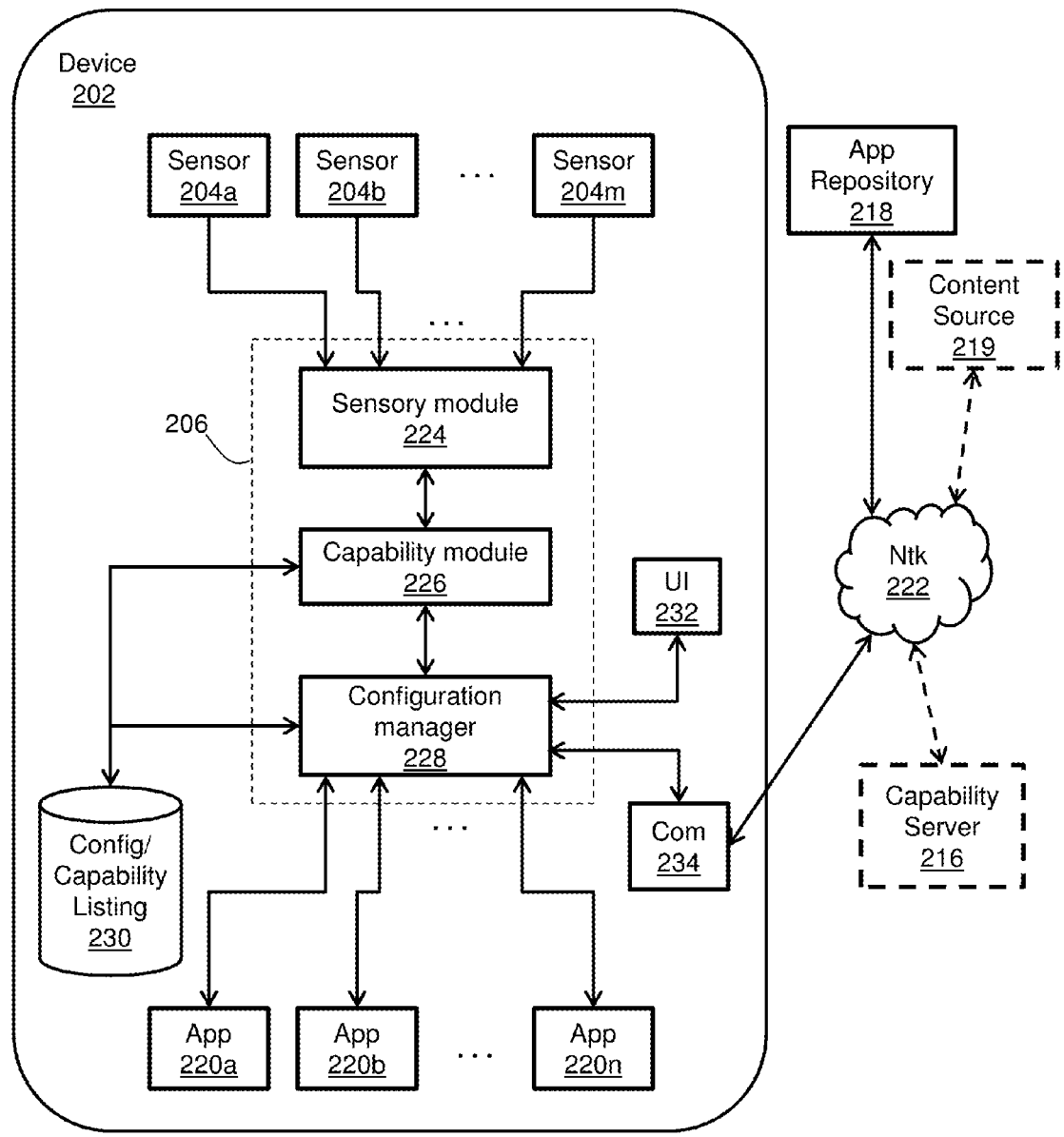
FIG. 2 depicts an illustrative embodiment of another system that manages capabilities based on sensor data.

FIG. 2 depicts an illustrative embodiment of another system 200 that manages capabilities based on sensor data. The system 200 includes a device 202 and a content, e.g., an app and/or media content repository 218. In some embodiments, the system 200 includes a capability server 216. One or more of the app repository 218 and the capability server 216 can be in communication with the device 202 by way of a network 222, such as the a wide area network, e.g., the Internet and/or a Public Switched Telephone Network (PSTN), a mobile operator network, an IP Multimedia Subsystem (IMS), a Local Area Network (LAN), a cable and/or satellite service provider network, or some combination thereof.

The device 202, in turn, includes one or more sensors 204a, 204b, . . . 204n (generally 204), a capability manager 206, and one or more apps 220a, 220b, . . . 220m (generally 220). In some embodiments, the device 202 includes one or more of a user interface (UI) 232, a communication module 234 and or local storage 230, e.g., that stores a configuration of the device 202. Stored configuration information can include one or more of a listing of the apps 220, associated capabilities, sensors 204, e.g., related to sensor data, data types, formats, ranges, and the like.

The user interface 232 can provide information to a user, e.g., including one or more of sensor data, capabilities, capability status, e.g., resident/not resident, and the like. The user interface can include one or more of a display providing one or more of text and graphics, e.g., a graphic user interface (GUI). In at least some embodiments, the user interface 232 includes a data entry device, such as a keyboard, a keypad, a button, a switch, a touch screen, a microphone, a camera and the like.

The communication module 234 can include one or more of a network interface card, and/or physical layer mechanisms to support any of the various network types disclosed herein, e.g., operating according to one or more protocols. For example, a mobile device 202 can include one or more communication modules 234 implementing wireless access and access to wireless services, such as those disclosed herein and available under $3^{rd}$ Generation Partnership Protocol (3GPP) standards including one or more of 2G, 3G, 4G, 5G, UMTS, LTE, LTE-Advanced, and the like.

In more detail, the capability manager 206 can include a sensory module 224, a capability module 226 and/or a configuration manager 228. The sensory module 224 can receive sensor data from the sensors 104, and provide an output to one or more of the capability module 226 and the configuration manager 228, based on the sensor data. It is understood that the sensory module 224 can perform one or more of a data formatting, a data interpretation and a data processing of the sensor data received from the sensors 104. Such processing can include, without limitation, filtering, translation, reformatting, combination, error detection and the like. Filtering can include statistical filtering, e.g., determining an average, a standard deviation, and the like, such that capabilities can be determined by the capability module 226 based on the pre-processed data provided by the sensory module 224. In some embodiments, an application program participates in determination of a capability based on output from the sensory module 224. Such participation can include processing of data obtained from the sensory module 224, e.g., by combining results of multiple sensors, by applying ranges to one or more of the sensors, by converting, adapting or otherwise manipulating data obtained from one or more sensors.

In some embodiments, the capability module 226 access a capability listing that can include an association of capabilities with sensor data, including pre-processed sensor data. Having identified a target capability based on the sensor data, the capability module 226 can interact with the configuration manager 228 to determine whether the target capability is already available at the device 202.

The configuration manager 228 can be adapted to identify content, e.g., apps 220 and/or media content items already resident on the device 202. In some embodiments, the configuration manager 228 accesses configuration data maintained at the local storage 230. It is understood in at least some embodiments, the configuration information can be maintained entirely on the device 202, external to the device 202, e.g., by a mobile service provider and/or some other third party, such as a device configuration service provider, or some combination thereof. For example, the configuration data can include one or more of a listing of the content, e.g., the apps 220 and/or the media content items, a listing of capabilities of the device 202, an association of apps 220 and/or media content items with the capabilities, and the like. In some embodiments, the configuration information is shared by the configuration manager 228 with the capability module 226.

In response to a determination that a suitable target capability is not available to the device, the configuration manager 228 and/or the capability module 226 identifies one or more content items, e.g., apps 220 and/or media content items to provide the target capability. The configuration manager 228 and/or the capability module 226 can identify a source of the content item, e.g., app 220, such as the app repository 218 and or content source 219, and facilitates a provisioning of the app 220 to the device 202. Such provisioning can include submitting a request for the app 220 to the app repository 218, reception of the app 220 and/or installation of the app 220 on the device 202.

Figure 3:
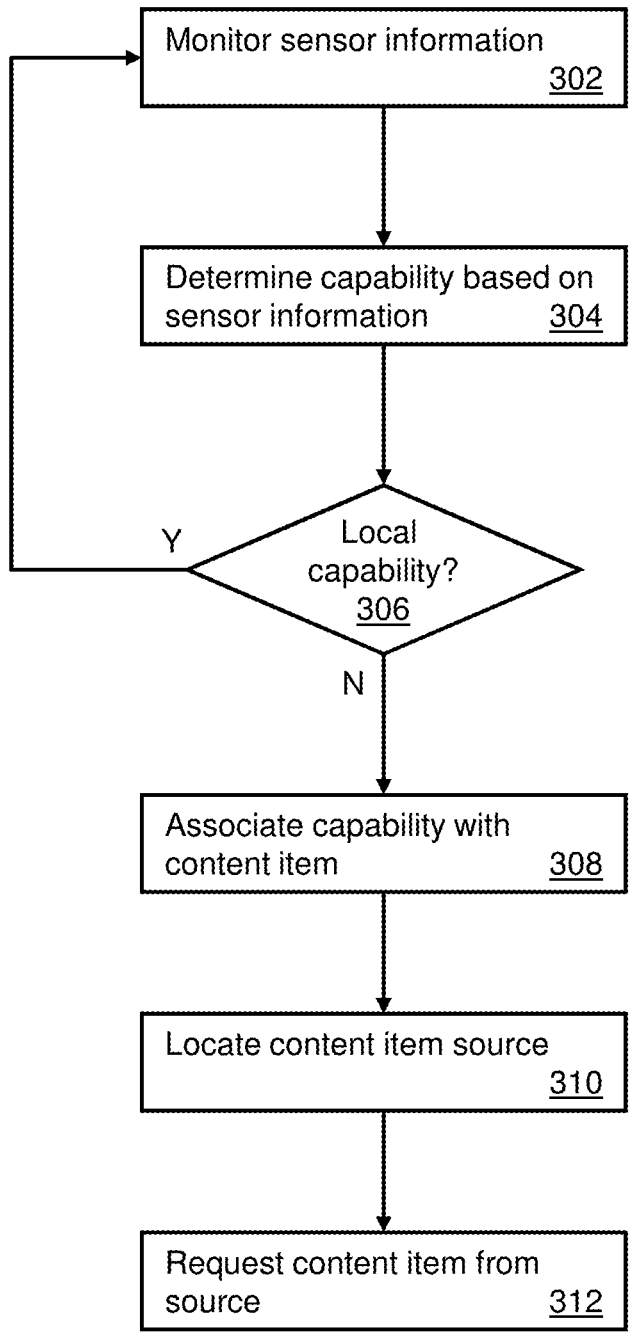
FIG. 3 depicts an illustrative embodiment of a process used in portions of the system described in FIGS. 1 and/or 2.

FIG. 3 depicts an illustrative embodiment of a process 300 used in portions of the system described in FIGS. 1 and/or 2. According to the process 300, sensor data is monitored at 302. Monitoring of the sensor data can include any of the techniques disclosed herein, such as monitoring raw sensor data, pre-processed sensor data or any combination thereof. The monitoring can be accomplished individually, e.g., for each of the sensors 104, 204, or for a combination of a group of more than one of the sensors. In some embodiments, the monitoring can be performed in real time or in near-real time. Such monitoring would support configuration adaptations, as may be necessary, in an expedient manner, e.g., "on-the fly."

A capability based on sensor information is determined at 304. The capability can include, without limitation, a capability related to the device 102, 202, e.g., related to control and/or use of a device feature, such as a camera, a microphone, a display a light source, a speaker, a power charger, a power control/conservation module or process, an antenna, or the like, of the device. Alternatively or in addition, the capabilities can relate to an app 120, 220.

Capabilities can be categorized, e.g., according to types of applications. For example, capabilities can relate to one or more of utilities, productivity, finance, investment, communication, language, music, audio, shopping, news, books, reference, business, games, exercise, maps, navigation, orientation, travel, presentation, and tools. Other categorizations can include, without limitation: health and wellness; food and drink; education; lifestyle; entertainment; video; medical; photography; social networks; sports; weather, and the like.

A determination as to whether the target capability is available, or not, to the device is accomplished at 306. The determination can be based on review of a device configuration. In some embodiments, the device configuration identifies capabilities of the device, such that a determination as to the availability (or not) can be accomplished by reviewing the listing of the capabilities. To the extent that the capability is available to the device at 306, the process continues to monitor sensory information at 302, without provisioning any other app(s) in association with the target capability.

To the extent that the capability is not available to the device at 306, the target capability is associated with a content item, e.g., an application, or app 120, 220, at 308. In some embodiments, the association can be accomplished by reviewing, consulting or otherwise accessing a predetermined association or listing between capabilities and apps. For example, such a predetermined listing can be stored locally at the device, or otherwise accessed remotely by the device. It is envisioned that in some instances, an exact match may not be included in any such listing between the target capability and an app. In some embodiments, an algorithm can be applied and/or an educated guess can be made at 308 as to an association. Results of such algorithms/educated guesses can be evaluated, e.g., based on user feedback, a monitoring as to whether the resulting app is later used or not, error records, and so forth. The algorithms/educated guesses and/or any related evaluations can be used in at least some instances to update an association between capabilities and apps.

It is understood that in at least some embodiments, an association of the capability with the application can be performed before step 306, such that a determination of a local capability can be accomplished by a determination whether a present device configuration includes the app and/or apps associated with the target capability.

To the extent that the capability is not available locally, a content item source, e.g., an application source, is identified at 310. The application source can include one or more of a default content item, e.g., application source, such as an enterprise app store, a predetermined listing of application sources, e.g., the App Store, an enterprise app store and/or one or more other preferred third party app distribution platforms.

A request for the one or more content items, e.g., applications from one or more of the identified sources is made at 312. In some embodiments, the request can be made automatically, i.e., without user intervention, such that an app can be provisioned automatically and seamlessly, when needed, based on sensor data obtained from an environment of the device 102, 202. In some embodiments, the provisioning process can proceed without notification to a user of the device. Alternatively or in addition, the user can be provided with a notification that an app has been/is being provisioned. Such notification can be provided by one or more of the UI 232 features, e.g., a text message, a textual and/or graphical notification, an audible alert, a voice synthesized alert or notice, and so forth.

In some applications, such automatic provisioning of content items, e.g., apps and/or media content items to a device can be made contingent upon user and/or device authorization. For example, a notification to a user can indicate that an app and/or a media content item has been identified based on an environmental condition. The notification can request user acceptance before proceeding with the provisioning of the device.

In some applications a provisioning of the app(s) and/or media content item(s) can be based on one or more factors, such as completion/acceptance of payment process, a determination as to whether sufficient storage capacity is available on the device 102, 202, user authorization, and the like.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

By way of illustrative embodiment, a device image sensor captures an image and/or video scene. The process 300 monitors at 302 a sensory event being a scene of a local environment of the device 102. 202. An image sensor 104, 204a provides image and/or video data related to the scenic information. The capability manager 106, 206 can determine or otherwise identify at 304 one or more target capabilities related to images and/or video, such as image processing, image storage, video editing, video broadcast, and the like. The process 300 can determine at 306 whether any of the identified capabilities are already available at the device 102, 202, according to the techniques disclosed herein. To the extent that the process 300 determines at 306 that the target capability is not available, the process 300 associated the capability with content, e.g., an app at 308, and locates a source of the application at 308, e.g., using the Google Play app that is resident on the device 102, 202. The process 312 requests the app(s) from the identified source at 312, to automatically initiate a provisioning at 312 of the app(s) to the device 102. 202.

In some embodiments, the capability manger 106, 206 monitors usage of the provisioned content, e.g., app and/or requests user feedback as to performance, satisfaction, comments, and the like, with the app. A configuration and/or capability listing can be updated based on the subsequent usage monitoring and/or user feedback. Beneficially, the process conserves memory by not storing the content, e.g., app, locally when a corresponding target capability is not needed, and by provisioning the content, e.g., app, only when needed. Additionally, the provisioning of the content, e.g., app, can be automated to proceed without requiring user intervention, e.g., to select an app, to locate an app distribution platform, to acquire the app, and so forth.

Figure 4:
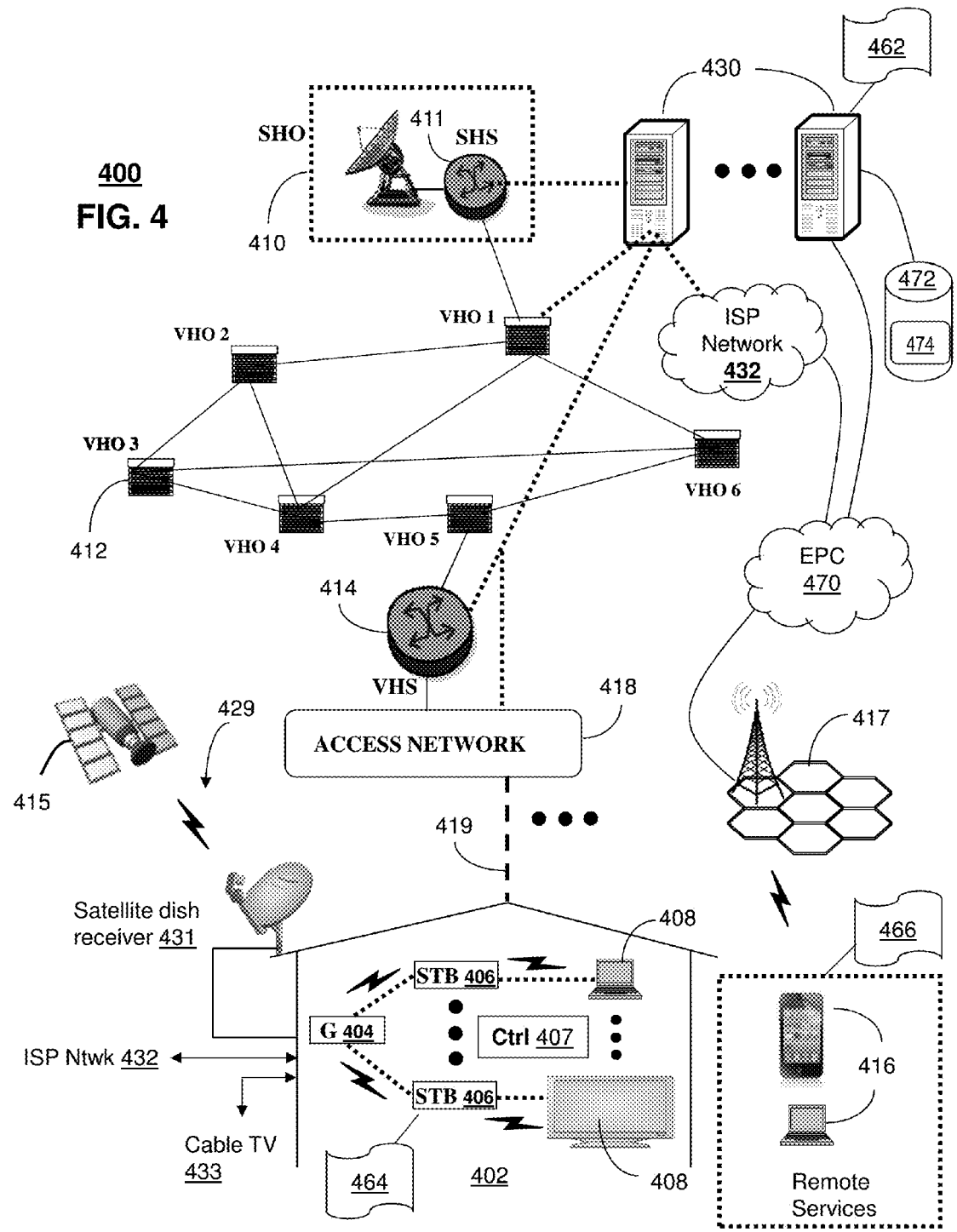
FIG. 4 depicts an illustrative embodiment of a communication system that provides media services for the devices of FIGS. 1 and 2 and according to the process of FIG. 3.

FIG. 4 depicts an illustrative embodiment of a first communication system 400 for delivering media content. The communication system 400 can represent an Internet Protocol Television (IPTV) media system. Communication system 400 can be overlaid or operably coupled with the systems 100, 200 of FIGS. 1 and/or 2 as another representative embodiment of communication system 400. For instance, one or more devices illustrated in the communication system 400 of FIG. 4 detect sensor data obtained from a sensor of a device, such as a mobile communication device 416. According to functionality 466, a capability, e.g., an operational capability, is determined based on the sensor data, and a determination is made that the capability is not available at the device 416. In response to determining that the capability is not available at the device 416, a content item, e.g., an application program 474 is identified based on the operational capability and a transfer is facilitated of the application program 474 to the device 416.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. In some embodiments, the content includes other formats, such as text and/or application programs. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an application server (herein referred to as a capability server 430). The capability server 430 can use computing and communication technology to perform function 462, which can include among other things, at least a portion of the techniques described by the process 300 of FIG. 3. For instance, function 462 of the capability server 430 can be similar to the functions described for the cloud platform 116 of FIG. 1, the capability server 216 and/or the app repository 218 of FIG. 2 in accordance with the process 300. The media processors 406 and wireless communication devices 416 can be provisioned with a software function 464, to utilize the services of the capability server 430. For instance, the function 464 of a media processors 406 and wireless communication devices 416 can be similar to the functions described for the devices 100, 200 of FIGS. 1 and/or 2 in accordance with the process 300 of FIG. 3.

In the illustrative embodiment, the capability server 410 is accessible by way of one or more of a network service provider, an internet service provider 432 and/or an evolved packet core (EPC) of an LTE mobility network 417. Likewise, the capability server 430 is in communication with an application repository 472 storing one or more apps 474.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

By way of example, a user, e.g., a subscriber, is watching a program on TV. The user observes an actor in the TV program that looks familiar. The user captures an image and/or audio of the TV program. For example, the user takes a picture and/or captures an audio sample using a smart phone of what the user is seeing and/or hearing. This picture and/or audio sample is then compared to information in a repository that returns the actor's name, bio and/or videography. For example, the results can include a list of movies. Any of the movies represent content and the capability relates to an identity of the actor and/or performer, e.g., does the user device have a capability that includes video and/or audio of the identified actor/performer.

Alternatively, a user or subscriber watching the TV program on an Internet enabled, or "smart" TV, can perform a screen capture or "screen grab" of a portion of the TV program showing the actor. The screen grab can be used to instead of a photo obtained by the user's mobile device can be used to determine whether a capability, e.g., a media content item is available. For example, actors/actresses can be identified or otherwise "tagged" in TV programs and/or movies, e.g., as done in social media applications, such as Facebook. When such tags are available, the process can be based on the tag. Namely, a user can select a tagged actor/performer, and the process can determine whether a capability, including media content, is available on the device, and to identify, obtain or otherwise provision such content to the user's device when determined not available.

Alternatively or in addition, a user takes a picture using an image sensor, samples audio using a microphone, and/or obtains a screen grab of a TV program and/or movie observed on a user's TV and/or media player. The picture and/or screen grab is compared to a repository associated with a mobile device of the user. A result of the comparison can include a determination that a service matching the picture and/or screen grab is not present or otherwise available on the mobile device. A capability associated with the sensory information obtained from the TV program/movie is determined to be a mobile video/audio app and/or service that provides the sensed content and/or similar content, e.g., having the same actor, same genre, and the like. For example, a user watching a program using DIRECT TV® satellite service captures an image of the program using a camera of a mobile device. A determination is made that the mobile device does not have a DIRECT TV capability on the mobile device. A repository of a DIRECT TV app is identified and the DIRECT TV app is obtained and/or otherwise installed on the user's mobile device.

Figure 5:
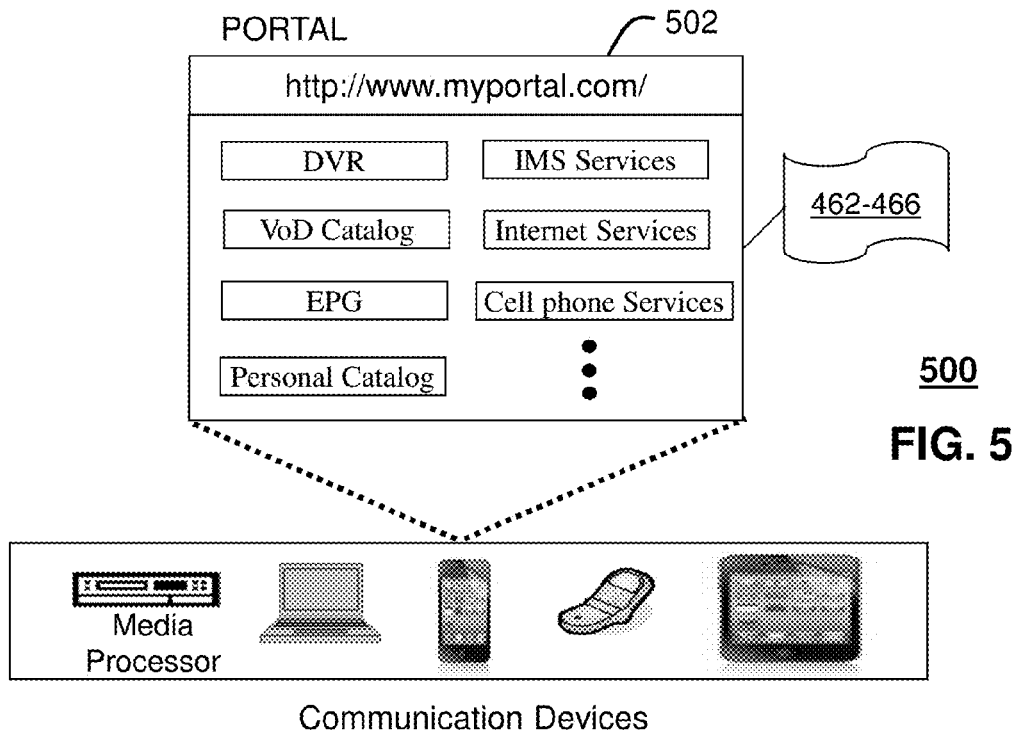
FIG. 5 depicts an illustrative embodiment of a web portal for interacting with the communication systems of FIGS. 1-2, and 4.

FIG. 5 depicts an illustrative embodiment of a web portal 502 of a communication system 500. Communication system 500 can be overlaid or operably coupled with the systems 100, 200 of FIGS. 1 and/or 2, and/or the communication system 400 of FIG. 4 as another representative embodiment of the systems 100, 200 of FIGS. 1 and/or 2, and/or the communication system 400 of FIG. 4. The web portal 502 can be used for managing services of systems 100, 200 of FIGS. 1 and/or 2, and/or the communication system 400 of FIG. 4. A web page of the web portal 502 can be accessed by a Uniform Resource Locator (URL) with an Internet browser using an Internet-capable communication device such as those described in FIGS. 1 and/or 2, and/or FIG. 4. The web portal 502 can be configured, for example, to access a media processor 406 and services managed thereby such as an acquisition and management of apps on the media processor 406, a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning app services described earlier, provisioning Internet services, provisioning cellular phone services, and so on.

The web portal 502 can further be utilized to manage and provision software applications 462-466 to adapt these applications as may be desired by subscribers and/or service providers of systems 100, 200 of FIGS. 1 and/or 2, and the communication systems 400 of FIG. 4. For instance, users of the services provided by the cloud platform 116, the app repository 218 and/or the capability servers 216, 430 can log into their on-line accounts. Such access can include app developers, app distributors and/or distribution sources that can provision, monitor and/or maintain the cloud platform 116, the app repository 218 and/or the capability servers 216, 430 with apps, associations of capabilities with apps, device configurations, and so on. Alternatively or in addition, such access can include device users that can access and provision the devices 102, 202, 406, 416 with apps, capabilities, device configurations, and so on. Such configurable features can include, without limitation, profiles, preferences, e.g., whether user notification and/or authorization is required for downloading apps, provide contact information to server to enable it to communication with devices described in FIGS. 1-2 and 4, and so on.

Figure 6:
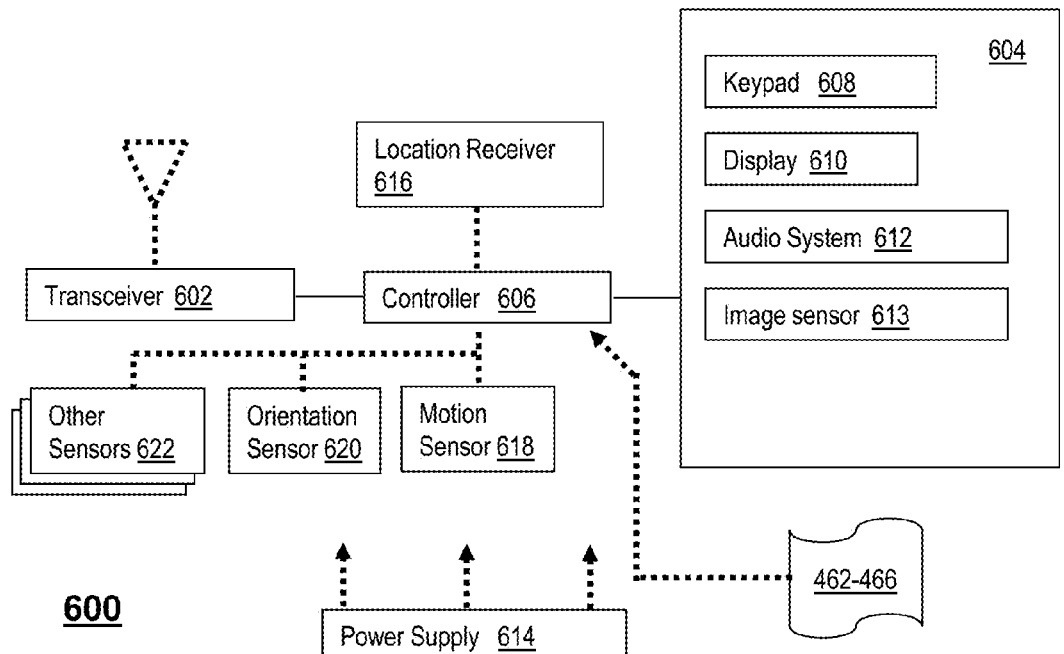
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1, 2 and/or 4 and can be configured to perform portions of the process 300 of FIG. 3.

The communication device 600 can include a wireline and/or wireless transceiver 602 (herein transceiver 602), a user interface (UI) 604, a power supply 614, a location receiver 616, a motion sensor 618, an orientation sensor 620 and a controller 606 for managing operations thereof. In some embodiments, the device 600 includes, other sensors 622. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the devices 100, 200 of FIGS. 1 and/or 2, the media processor 406, the media devices 408, or the portable communication devices 416 of FIG. 4. It will be appreciated that the communication device 600 can also represent other devices that can operate in systems 100, 200 of FIGS. 1 and/or 2, and/or communication system 400 of FIG. 4 such as a gaming console and a media player. In addition, the controller 606 can be adapted in various embodiments to perform the functions 462-466, respectively.

Upon reviewing the aforementioned embodiments, it would be evident to an artisan with ordinary skill in the art that said embodiments can be modified, reduced, or enhanced without departing from the scope of the claims described below. For example, in some embodiments, capabilities are removed. Such removal can be a routine matter, e.g., after some period of time, some number of uses, some accrued charge(s) associated with the app, some period of inactivity of the device and/or non-use of the app, available storage capacity, network availability, and any combination thereof. In this manner, a device can have access to a virtually limitless number of apps, without requiring excessive storage space that would otherwise be associated with a large number of apps.

In some embodiments, a record of apps previously provisioned and removed can be maintained for future reference, e.g., to simply one or more of the association of the capability with the application and/or location of the application. It is envisioned that in some instances, apps removed from the device 102, 202 can be removed to a remote storage that can be associated with the device 102, 202, e.g., by way of a user account and/or a device identifier. For example, apps can be removed from a device and stored remotely on a network accessible, e.g., cloud, storage account. Alternatively or in addition, some apps can be provisioned directly to a remote storage. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
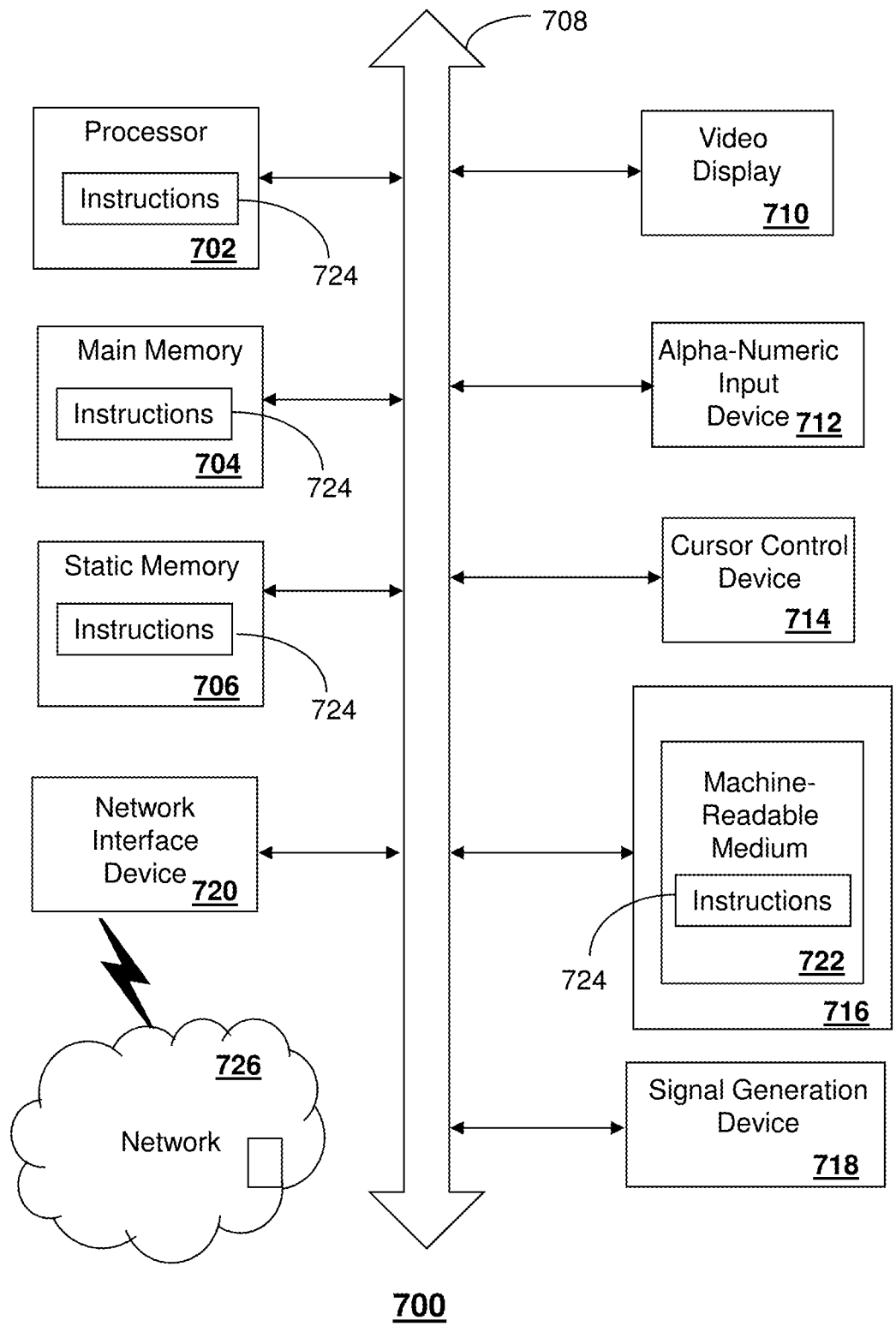
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the device 102, 202, the cloud platform 116, the capability server 216, the app repository 118, 218, the sensor, 104, 204, the capability manager 106, 206, the capability server 430, the media processor 406, and other devices of FIGS. 1-2 and/or FIGS. 4-7. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. For example, the disclosure is intended to cover mobile devices, such as mobile phones, tablets and the like, as well as other devices, such as personal computers, servers, Internet capable or smart TVs, media processors, residential gateways, and the like. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
monitoring first environmental sensor data obtained from a first environmental sensor of a mobile communication device, wherein the first environmental sensor is not a position sensor;
associating an operational capability related to control, use, or a combination of thereof, of a physical device feature of the mobile communication device with the first environmental sensor data;
determining that the operational capability is not available at the mobile communication device;
in response to the determining that the operational capability is not available:
identifying a mobile application based on the operational capability; and
facilitating a transfer of the mobile application from a distribution source;
monitoring second environmental sensor data obtained from a second environmental sensor that is different from the first environmental sensor;
responsive to monitoring the second environmental sensor data, determining that the mobile application is no longer to be utilized by the mobile communication device; and
responsive to determining that the mobile application is no longer to be utilized by the mobile communication device, facilitating a removal of the mobile application from the mobile communication device.

2. The device of claim 1, wherein the operations further comprise:
identifying a mobile application distribution source comprising the mobile application, wherein the mobile application is transferred from the mobile application distribution source to the mobile communication device.

3. The device of claim 2, wherein the mobile communication device operates within a physical environment, and wherein the first environmental sensor data comprises sensory information of the physical environment.

4. The device of claim 3, wherein the sensory information is selected from a group consisting of temperature, altitude, humidity, light, sound, magnetic field, movement, acceleration, orientation and any combination thereof.

5. The device of claim 1, wherein the facilitating of the transfer of the mobile application occurs automatically.

6. The device of claim 1, wherein the determining that the operational capability is not available at the mobile communication device further comprises:
identifying a plurality of resident mobile applications available at the mobile communication device;
determining a plurality of resident capabilities provided by the plurality of resident mobile applications; and
comparing the operational capability to the plurality of resident capabilities.

7. The device of claim 1, wherein the associating of the operational capability with the first environmental sensor data further comprises utilizing a predetermined association of operational capabilities with a listing of sensor data including the first environmental sensor data.

8. A non-transitory, machine-readable storage medium, comprising executable instructions that, when executed by a processing system including a processor, facilitate performance of operations, comprising:
detecting first environmental sensor data obtained from a first environmental sensor of a device, wherein the first environmental sensor is not a position sensor;
identifying an operational capability related to control, use, or a combination thereof, of a physical device feature of the device based on the first environmental sensor data;
determining that the operational capability is not available at the device; and
in response to the determining that the operational capability is not available:
identifying an application program based on the operational capability; and
facilitating a transfer of the application program to the device;
detecting second environmental sensor data obtained from a second environmental sensor that is different from the first environmental sensor;
responsive to detecting the second environmental sensor data, determining that the application program is no longer to be utilized by the device; and
responsive to determining that the application program is no longer to be utilized by the device, facilitating a removal of the application program from the device.

9. The non-transitory, machine-readable storage medium of claim 8, wherein the operations further comprise:
identifying an application distribution source comprising the application program, wherein the application program is transferred from the application distribution source to the device.

10. The non-transitory, machine-readable storage medium of claim 9, wherein the device operates within a physical environment, and wherein the first environmental sensor data comprises sensory information of the physical environment.

11. The non-transitory, machine-readable storage medium of claim 10, wherein the sensory information is selected from a group consisting of temperature, altitude, humidity, light, sound, magnetic field, movement, acceleration, orientation and any combination thereof.

12. The non-transitory, machine-readable storage medium of claim 8, wherein the facilitating of the transfer of the application program occurs automatically.

13. The non-transitory, machine-readable storage medium of claim 8, wherein the determining that the operational capability is not available at the device further comprises:
identifying a plurality of resident application programs available at the device;
identifying a plurality of resident capabilities provided by the plurality of resident application programs; and
comparing the operational capability to the plurality of resident capabilities.

14. A method comprising:
- detecting, by a processing system including a processor, first environmental sensor data obtained from a first environmental sensor of a device, wherein the first environmental sensor is not a position sensor;
- identifying, by the processing system, an operational capability related to control, use, or a combination thereof, of a physical device feature of the device based on the first environmental sensor data;
- determining, by the processing system, that the operational capability is not available at the device; and
- in response to the determining that the operational capability is not available:
  - identifying, by the processing system, an application program based on the operational capability; and
  - facilitating, by the processing system, a transfer of the application program to the device;
- detecting, by the processing system, second environmental sensor data obtained from a second environmental sensor that is different from the first environmental sensor;
- responsive to detecting the second environmental sensor data, determining, by the processing system, that the application program is no longer to be utilized by the device; and
- responsive to determining that the application program is no longer to be utilized by the device, facilitating, by the processing system, a removal of the application program from the device.

15. The method of claim 14, further comprising:
- identifying, by the processing system, an application distribution source comprising the application program, wherein the application program is transferred from the application distribution source to the device.

16. The method of claim 14, wherein the device operates within a physical environment, and wherein the first environmental sensor data comprises sensory information of the physical environment.

17. The method of claim 16, wherein the sensory information is selected from a group consisting of temperature, altitude, humidity, light, sound, magnetic field, movement, acceleration, orientation and any combination thereof.

18. The method of claim 14, wherein the facilitating of the transfer of the application program to the device occurs automatically.

19. The method of claim 14, wherein the determining that the operational capability is not available at the device further comprises:
- identifying a plurality of resident application programs available at the device;
- identifying a plurality of resident capabilities provided by the plurality of resident application programs; and
- comparing the operational capability to the plurality of resident capabilities.

20. The method of claim 14, further comprising:
- responsive to the identifying of the application program, locating, by the processing system, a source of the application program,
- wherein the facilitating of the transfer of the application program to the device is responsive to the locating of the source of the application program.

* * * * *